United States Patent
Morris

[11] Patent Number: 5,512,252
[45] Date of Patent: Apr. 30, 1996

[54] DISSIPATOR FOR FLUE GAS DESULFURIZATION SYSTEM

[76] Inventor: George Morris, Rte. #4, Box 552, West Frankfort, Ill. 62896

[21] Appl. No.: 240,028

[22] Filed: May 9, 1994

[51] Int. Cl.⁶ .......................... B01D 47/02; C01B 17/60
[52] U.S. Cl. .............. 422/176; 55/256; 55/260; 55/442; 55/462; 95/221; 95/226; 95/235; 261/121.1; 261/DIG. 9; 366/340; 422/224; 422/228
[58] Field of Search ..................... 422/176, 177, 422/168, 211, 224, 228, 231, 220; 55/244, 256, 260, 308, 442, 462; 95/216, 221, 226, 235, 272; 261/77, 121.1, 122.1, 123, DIG. 9; 366/336, 340; 423/242.1, 243.01

[56] References Cited

U.S. PATENT DOCUMENTS

| | | | |
|---|---|---|---|
| 1,491,049 | 4/1924 | Lichtenthaeler | 366/340 |
| 3,768,233 | 10/1973 | Mateson | 55/442 X |
| 4,135,180 | 1/1979 | White | 366/336 |
| 4,539,184 | 9/1985 | Stehning | 422/231 X |
| 4,581,899 | 4/1986 | von Klock et al. | 95/213 X |
| 4,732,585 | 3/1988 | Lerner | 95/221 |
| 4,907,725 | 3/1990 | Durham | 366/336 X |
| 5,004,486 | 4/1991 | Chen | 261/DIG. 9 X |
| 5,106,603 | 4/1992 | McCord et al. | 423/243.01 |

Primary Examiner—Robert J. Warden
Assistant Examiner—Robert Carpenter
Attorney, Agent, or Firm—Armstrong, Teasdale, Schlafly & Davis

[57] ABSTRACT

A dissipator for percolating a mixture of flue gases and powdered lime through a body of water to remove $SO_2$ from the flue gases includes an elongate tubular body having first and second ends. The first end of the tubular body has an inlet through which the flue gases and lime mixture is introduced into the dissipator. The second end of the tubular body is generally closed. There are a plurality of perforations in the wall of the tubular body through which the mixture of lime and flue gases can escape from the dissipator. A plurality of disrupters spaced longitudinally inside the elongate tubular body facilitate the mixing and reaction of the lime and the flue gases. Each disrupter comprises a plate with a plurality of baffles mounted on the upper thereof to facilitate the mixing of the flue gases and powdered lime mixture delivered into the dissipator. Preferably these baffles are wedge-shaped members, spaced about the circumference of the plate, and oriented with their apices pointing generally toward the center of the plate.

6 Claims, 2 Drawing Sheets

DISSIPATOR FOR FLUE GAS DESULFURIZATION SYSTEM

BACKGROUND AND SUMMARY OF THE INVENTION

This invention relates to a flue gas desulfurization system, and in particular to a dissipator for mixing flue gases and lime and ejecting the mixture into a water pool to react the $SO_2$ in the flue gases with the lime, thereby removing the $SO_2$ from the flue gases.

Flue gases from the combustion of coal, for example in a power plant, contain varying amounts of $SO_2$, resulting primarily from the sulfur in the coal. This $SO_2$ is an undesirable pollutant, responsible for acid rain, and various attempts have been made to remove $SO_2$ from flue gases. One method involves reacting the $SO_2$ with lime to make calcium sulfate ($CaSO_4$). This calcium sulfate can then be disposed of or put to use, for example in making wallboard.

The present invention relates to a dissipator apparatus for mixing powdered lime and flue gases, and ejecting this mixture into a water pool to facilitate the reaction of the lime and the $SO_2$ in the flue gases, thereby removing the $SO_2$ from the flue gases. Generally the dissipator of the present invention comprises an elongate tubular body having first and second ends. The first end has an inlet through which the mixture of flue gases and lime is introduced into the dissipator. The second end is generally closed. There are plurality of perforations in the sidewall of the tubular body through which the mixture of flue gases and lime can escape from the dissipator. There is a series of disrupters spaced longitudinally inside the elongate tubular body. Each disrupter comprises a plate with a plurality of baffles mounted on the top surface thereof to facilitate the mixing of the flue gases and powdered lime delivered to the dissipator.

In the preferred embodiment, each disrupter comprises a flat, generally circular plate, and the baffles comprise a plurality of wedge-shaped members, the members being spaced about the circumference of the plate, and oriented with their apices pointing generally toward the center of the plate. The size of the disrupters increases toward the second end of the tubular body, which is preferably concave, and most preferably a hollow blunt cone.

The configuration of the dissipator, and particularly the series of disrupters, causes improved mixing of the flue gases and the powdered lime, facilitating the reaction between the $SO_2$ in the flue gases and the lime. Thus the dissipator helps to remove a substantial amount of the $SO_2$ from the flue gases. The dissipator is of simple and reliable construction, and thus is relatively inexpensive to construct and maintain.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
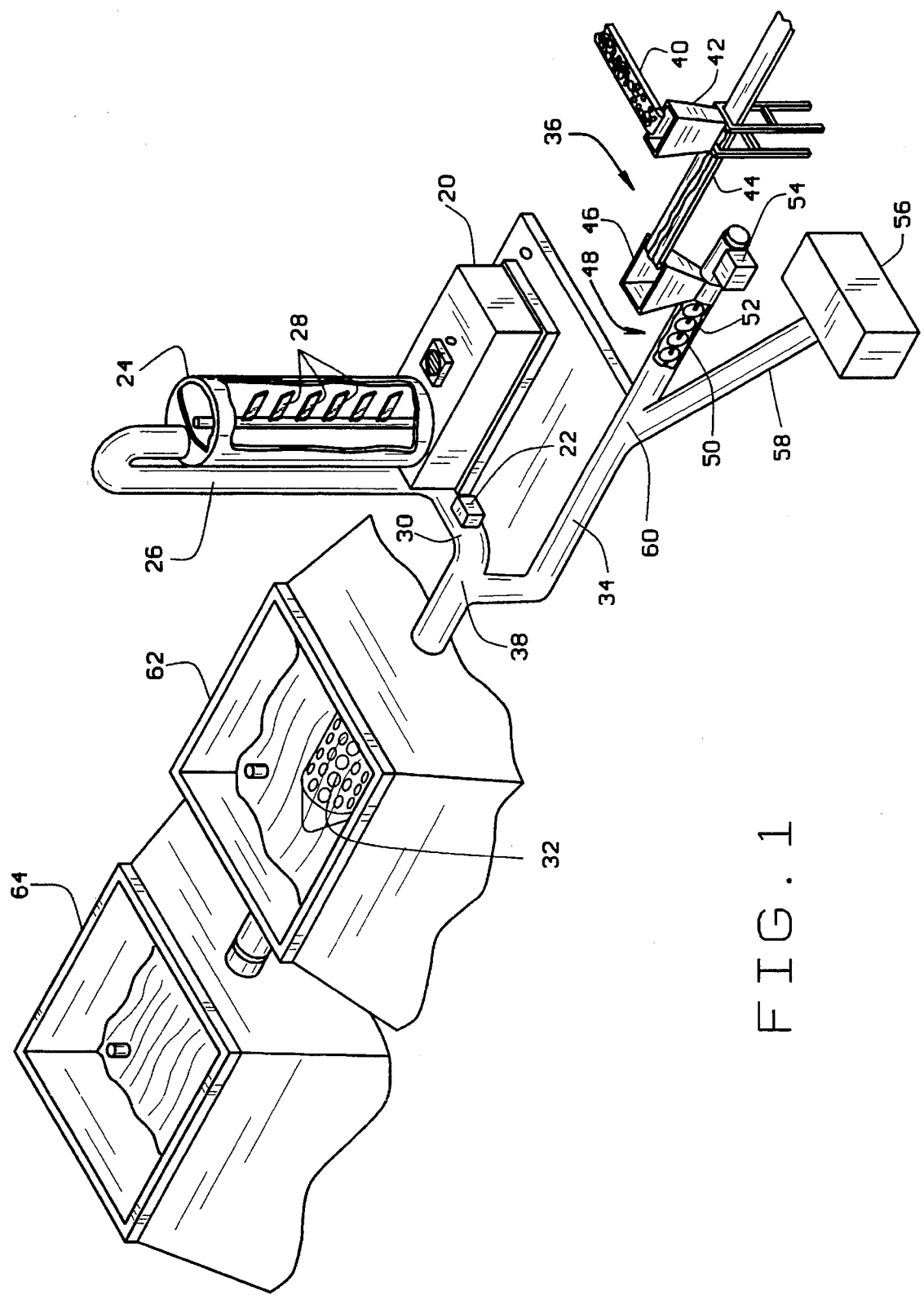
FIG. 1 is a schematic view of a desulfurization system of the type in which the dissipator of the present invention might be employed.

FIG. 1 is a schematic view of a desulfurization system for flue gases of the type in which the dissipator of the present invention might be employed. The desulfurization system comprises a flue gas intake 20, which is connected to the flue of a coal furnace, such as in an electric power plant. A blower 22 draws the flue gases upwardly through a column 24 which is connected to the intake 20, and downwardly through duct 26. There are a plurality of movable baffles 28 inside the column 24 which can be independently controlled to control the flow of flue gases through the column.

The outlet end of the duct 26 is connected to inlet pipe 30 that connects to a dissipator 32. A lime supply line 34, extending from lime supply system 36, also connects to the inlet pipe 30, at junction 38.

The lime supply system 36 comprises a first conveyor belt 40 that delivers lime to a crusher 42. The crusher delivers powdered lime to a second conveyor belt 44 which delivers the powdered lime to the hopper 46 of an auger 48. The auger 48 comprises an auger tube 50 inside of which is an auger screw 52 which is driven by motor 54. The auger 48 delivers powdered lime to the inlet of lime supply line 34. A blower 56 is connected by air conduit 58 to the inlet of the lime supply line 34, at junction 60. The powdered lime and air mix in the lime supply line 34 and are delivered to the inlet pipe 30, where the powdered lime and air initially mix with the flue gases.

Figure 2:
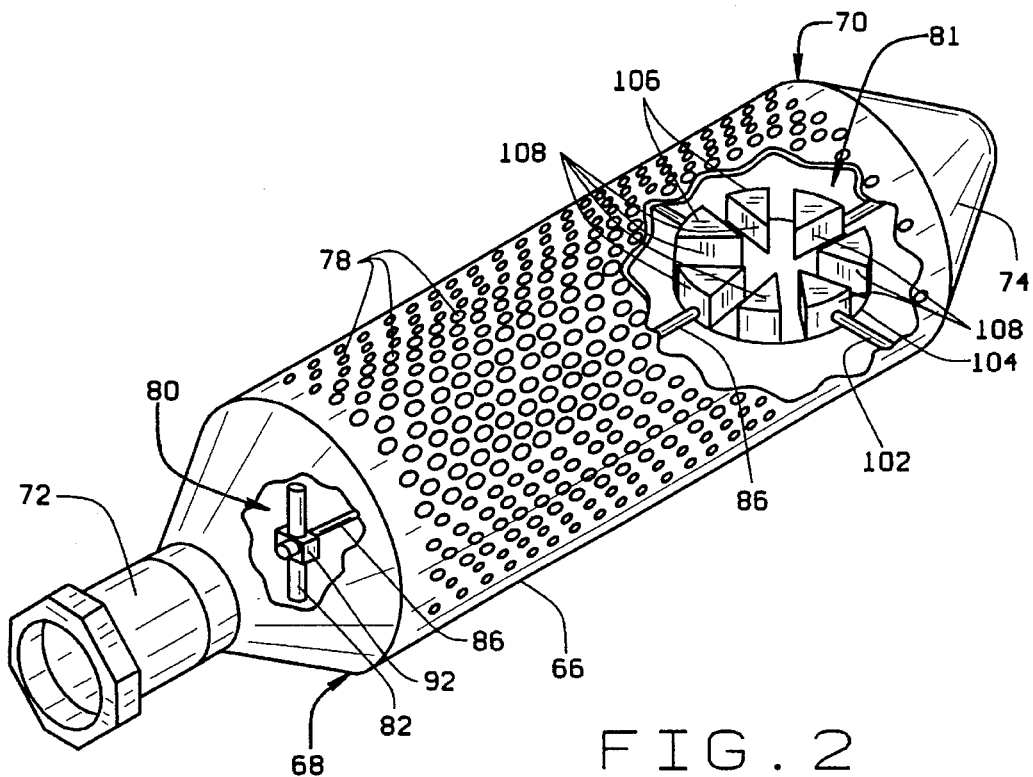
FIG. 2 is a perspective view of a dissipator constructed according to the principles of this invention; with a portion broken away to reveal details of construction.
Figure 3:
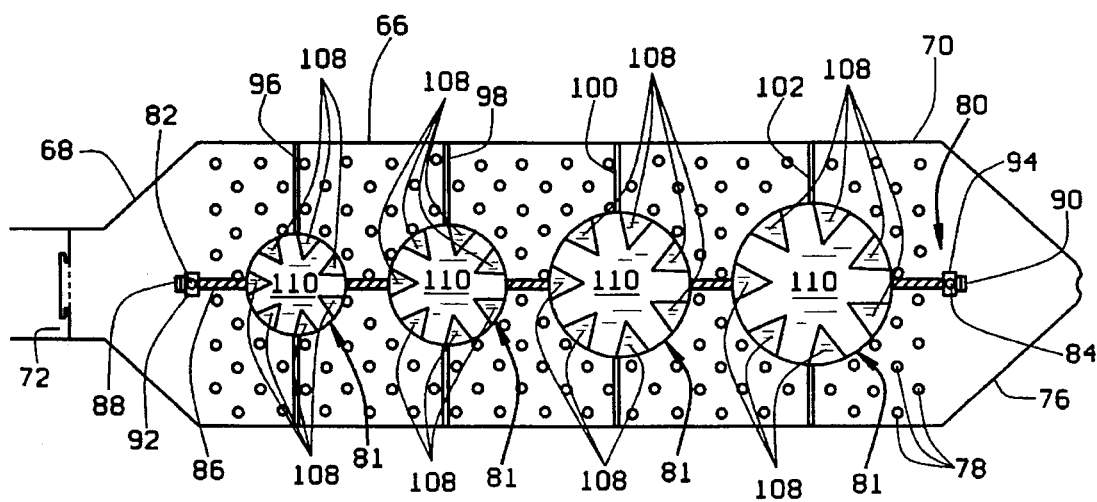
FIG. 3 is a horizontal cross sectional view of the dissipator.

The powdered lime, air, and flue gases, are delivered by the inlet pipe 30 in high volume to the dissipator 32, which is shown in detail in FIGS. 2 and 3. The dissipator 32 is immersed in a water tank 62, so that the lime and flue gases mixed in the dissipator 32 can percolate through the water. An auxiliary tank 64 may be provided to provide additional water for use in the desulfurization process, if desired.

The dissipator 32 comprises an elongate tubular body 66, having a first end 68 and a second end 70. There is an inlet 72 connected to the first end 68 of the tubular body 66. The inlet 72 is connected to the inlet pipe 30, through which the air, powdered lime, and flue gases enter the dissipator 32. The second end 70 of the dissipator 32 is substantially closed with a cap 74 that can be flat, but is preferably concave, and most preferably comprises a hollow, blunt cone 76.

The sidewall of the tubular body 66 has a plurality of openings 78 therein through which the mixture of air, powdered lime, and flue gases can percolate into the water surrounding the dissipator 32. The openings 78 are preferably uniformly sized and evenly distributed over the surface of the tubular body. There may be as many as 50 openings per square foot of surface, and these openings are preferably circular, with a size between ¾ inch and 1¼ inch in diameter.

Inside the dissipator there is a framework 80 for supporting a series of disrupters 81, described in more detail below, which facilitate the mixing and reaction of the lime with the flue gases. The framework 80 comprises a vertical post 82 generally adjacent the first end 68 of the tubular body 66, and a vertical post 84 generally adjacent the second end 70 of the tubular body. The tops of the posts 82 and 84 preferably extend through the sidewall of the tubular body 62, and are secured with looking nuts. Similarly, the bottoms of the posts 82 and 84 preferably extend through the sidewall of the tubular body, and are secured with looking nuts. A threaded rod 86 having first and second ends 88 and 90 extends longitudinally through the tubular body 66. The first end 88 of the rod 86 extends through, and is secured in a bracket 92 in the middle of the post 82, and the second end 90 of the rod extends through, and is secured in a bracket 94 in the middle of the post 84.

As best shown in FIG. 3, the framework 80 also includes four transverse supports 96, 98, 100, and 102. Each of these supports extends transversely across the tubular body 66, through one of the disrupters 81. The ends of the transverse supports preferably extend through the side wall of the tubular body 66, and are secured with locking nuts. The disrupters are thus positioned at the intersections of each transverse support with the rod 86, secured against axial movement by the rod, and secured against transverse movement by one of the transverse supports. The frame work 80 supports the disrupters 81 generally in the center of the tubular body, in alignment with the inlet 72, so that the incoming stream of air, lime, and flue gases passes over the disrupters.

Each of the disrupters 81 comprises a generally circular base plate 104, and a plurality of baffles 106 mounted on the top surface of the base plate. As shown in FIGS. 2 and 3, the baffles 106 are preferably wedge-shaped members 108. The wedge-shaped members 108 are spaced evenly around the circumference of the plate 104, and they are oriented such that their apices point generally toward the center of the plate. The wedge-shaped members thus define a star or spider shaped pattern 110 on each disrupter, which the inventor believes facilitates the mixing and reaction of the lime and the flue gases.

The size of the disrupters 81 increases from the first end 68 toward the second end 70 of the tubular body 66. For example the four disrupters might have the following sizes: 12 inches, 18 inches, 24 inches, and 36 inches.

The dissipator is preferably made entirely from stainless steel, and the surfaces are coated with a ceramic for protection. In a typical installation, the tubular body of the dissipator might be between about six and about eight feet in diameter, and the dissipator might be between about twenty and about twenty-five feet long. Of course the size could be changed to accommodate the flow of flue gases, or additional dissipators could be provided to increase the capacity of the system.

OPERATION

In operation, air, powdered lime and flue gases, are provided in large volume by the inlet pipe 30 to the inlet 72 of the dissipator. The air, powdered lime, and flue gases pass into the dissipator, where the disrupters 81 help the air, powdered lime, and flue gases to mix so that the $SO_2$ in the flue gas and the powdered lime can react. The air, powdered lime, and the flue gases percolate through the openings 78 in the sidewall of the tubular body 66, into the water tank 62, where calcium sulfate generated by the reaction of the $SO_2$ and the lime precipitates out and can be collected for disposal or use.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A dissipator for percolating a mixture of flue gases and powdered lime through a body of water to facilitate the reaction of the lime with $SO_2$ in the flue gases to remove the $SO_2$ from the flue gases, the dissipator comprising:

an elongate tubular body having a first end, a second end, and a sidewall, the first end having an inlet through which a mixture of flue gases and lime is introduced into the dissipator, the second end being substantially closed, and the sidewall attached to both the first and second ends;

a plurality of perforations in the sidewall of the tubular body through which the mixture of lime and flue gases can percolate from the dissipator;

a plurality of disrupters spaced longitudinally inside the elongate tubular body, each disrupter comprising a plate with an upper and a lower surface and with a plurality of baffles mounted on the upper surface of each plate to facilitate the mixing of the flue gases and powdered lime delivered into the dissipator.

2. The dissipator according to claim 1 wherein each disrupter comprises a flat, generally circular plate, and wherein the baffles comprise a plurality of wedge-shaped members, the wedge-shaped members being spaced about the circumference of the plate, and oriented with their apices pointing generally toward the center of the plate.

3. The dissipator according to claim 2 wherein the size of the disrupters increases toward the second end of the tubular body.

4. The dissipator according to claim 1 wherein the second end of the tubular body is closed with a blunt cone.

5. A dissipator for percolating a mixture of flue gases and powdered lime through a body of water to react $SO_2$ in the flue gases with the lime thereby removing the $SO_2$ from the flue gases, the dissipator comprising:

an elongate tubular body having first and second ends, a sidewall, and a plurality of perforations in the sidewall of the tubular body to allow the lime and flue gases to percolate from the dissipator;

an inlet at the first end of the tubular body;

a blunt conical cap at the second end of the tubular body, generally closing the second end of the tubular body;

a plurality of disrupters spaced longitudinally inside the elongate tubular body, each disrupter comprising a generally circular plate with an upper and a lower surface and with a plurality of wedge-shaped baffles mounted on the upper surface of each plate to facilitate the mixing of the flue gases and powdered lime mixture delivered into the dissipator.

6. The dissipator according to claim 5 wherein the size of the disrupters increase toward the second end of the tubular body.

\* \* \* \* \*